United States Patent Office 2,938,388
Patented May 31, 1960

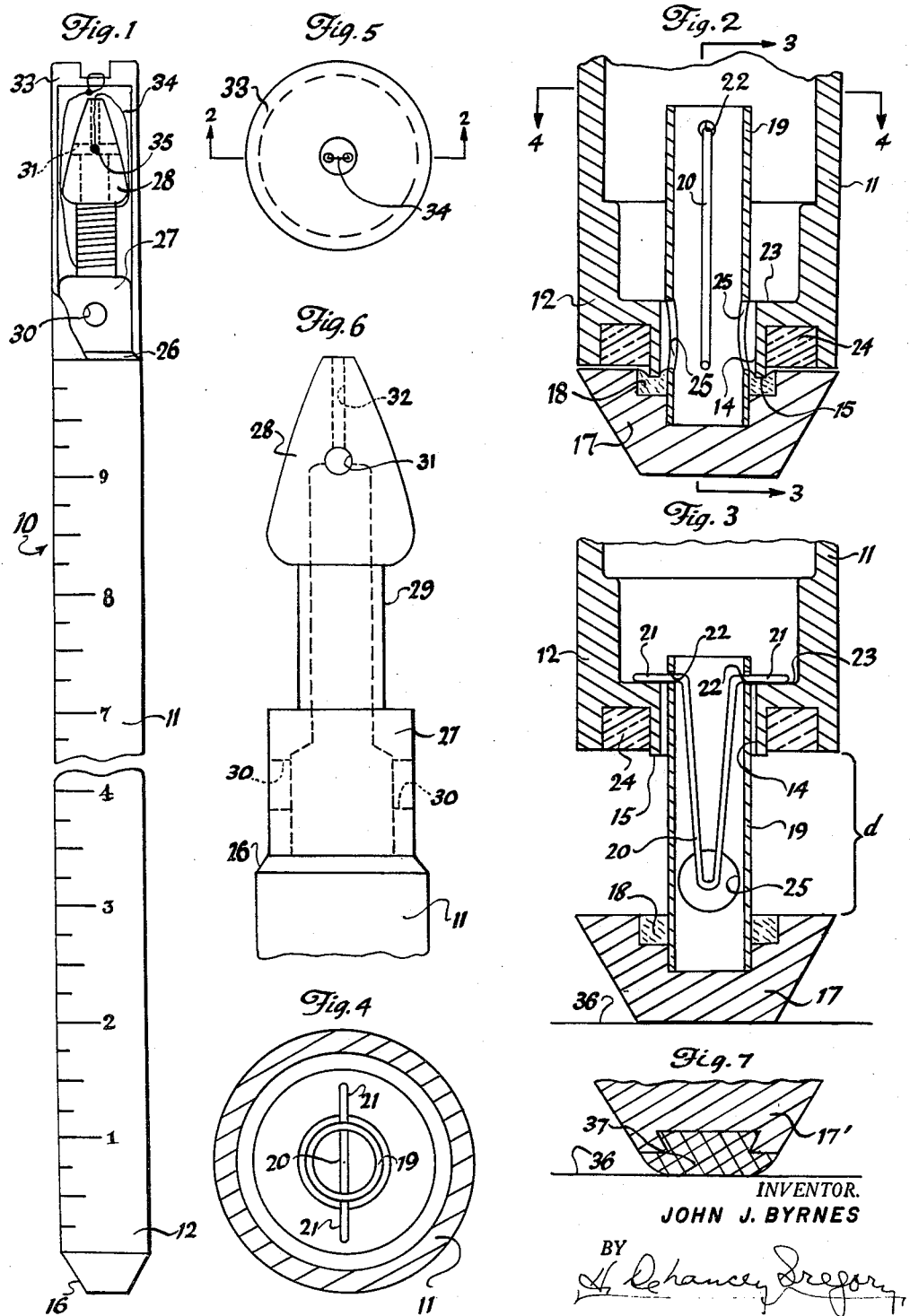

2,938,388

LIQUID-SAMPLING DEVICE

John J. Byrnes, Newark, N.J., assignor to
H. De Lancey Gregory, Newark, N.J.

Filed July 9, 1956, Ser. No. 596,469

8 Claims. (Cl. 73—425.4)

My invention relates to improvements in liquid-sampling devices and particularly to those for ascertaining as to the presence, in inches of depth, of water at the bottom of a tank containing fuel oil or any other liquid having a viscosity higher than that of water.

In each one of thousands of installations for oil burners wherein the fuel oil tank is underground, there is a vertically-disposed pipe referred to as a fill pipe. This fill pipe is also underground, its lower end being coupled to the tank and its upper end being substantially flush with the concrete or other surface leveled and finished off after the tank and fill pipe are covered over. The fill pipe is provided at its upper end with an internally threaded cap into which a brass stopper or closure element is screwed after fuel oil has been poured down the fill pipe to replenish the tank.

My invention herein is concerned with a problem involved wherever any one of the aforesaid thousands of underground fuel oil tanks is installed. This resides in the fact that during the course of time water finds its way into the tank on account of seepage at the bottom coupling or at the brass stopper, on account of some leak caused by corrosion or by a rupture or crack developed at some point in the installation, or on account of some other leak caused by operational carelessness. It is therefore important to keep a close check as to whether or not there is any water at the bottom of the tank, and if so what is its depth. Instruments or gauges for this purpose are disclosed in Patents Nos. 602,069, 848,898, 1,296,794, 2,580,711, and 2,593,830. Each of these, however, has one or more of the disadvantages of being too complicated in construction and manner of operation, too expensive, and insufficiently accurate or reliable in operation. Reference is also made to the respective disclosures in Patents Nos. 2,223,598, 2,515,- 882, 2,728,397, and 2,614,426.

With the foregoing in mind, it is one of the objects of my invention to provide an improved gauge or liquid-sampling device of the character referred to which is relatively simple in construction and manner of operation, which is relatively inexpensive to manufacture, and which is at all times reliable in operation and accurate well within the percentage of accuracy required.

Other objects and advantages will hereinafter appear.

For the purpose of illustrating my invention an embodiment thereof is shown in the drawings, wherein Fig. 1 is an elevational view, partly broken away, of a liquid-sampling device constructed and operating in accordance with my invention;

Fig. 2 is an enlarged, detail, sectional view, the section being taken on line 2—2 in Fig. 5;

Fig. 3 is a section taken on line 3—3 in Fig. 2;

Fig. 4 is a section taken on line 4—4 in Fig. 2;

Fig. 5 is a plan view of Fig. 1, the scale being twice that in Fig. 1;

Fig. 6 is an enlarged, fragmentary view of one of the parts in Fig. 1, the scale being twice that in Fig. 1; and Fig. 7 is an enlarged, fragmentary, sectional view illustrative of a modification.

In Fig. 1 the improved liquid-sampling device herein is designated generally by the reference numeral 10. It includes a tube 11 of transparent material such as that commonly referred to as Plexiglas. Tube 11 is provided at the end 12 thereof with an opening 14 for the entrance of a liquid into the tube as the device 10 is lowered into the liquid vertically disposed and with its end 12 lowermost, as shown in Fig. 1. Tube 11 is provided, about the liquid-inlet opening 14, with a seat 15 for a valve 16 comprised of two parts, i.e., a relatively heavy body part 17 of magnetic material such as iron, and an insert 18 of any suitable material such as that having the physical and chemical characteristics of the synthetic rubber commonly referred to a Neoprene.

One end of a relatively short piece of tubing 19 whose outside diameter is less than the diameter of opening 14, extends through the Neoprene insert 18 and into the iron valve part 17 with a press fit with respect to the latter. Thus, the piece of tubing 19 at this end thereof is fixed to valve 16 and holds and guides the valve for free movement longitudinally with respect to tube 11 to open and close opening 14. Tubing 19 is of a suitable non-magnetic material such as brass, and constitutes a stem for valve 16.

A V-shape clip 20 of brass wire is disposed and sprung within the tubing or hollow valve stem 19, its oppositely-directed ends 21 extending, respectively, through diametrically-opposite holes 22 in the upper end of tubing 19 and radially outward to engage a shoulder 23 disposed about opening 14, inwardly of valve seat 15. Thus, the ends 21 of clip 20 consitute means associated with the tubing or valve stem 19 for limiting longitudinal movement of valve 16 away from seat 15 to a predetermined distance therefrom, as shown in Fig. 3.

Molded into the end 12 of the plastic tube 11 and disposed about opening 14 and between valve seat 15 and shoulder 23, is a permanent magnet 24. The latter is an alloy of iron, nickel, aluminum, and cobalt; identified as alnico; or is the equivalent of such an alloy.

Tubing 19 at the end thereof fixed to valve 16, is provided with openings 25.

In the specific embodiment of my invention disclosed herein tube 11 measures ten inches from its tip at the lower end 12, to a shoulder 26 above which there is a cylindrical portion 27 about half an inch in length. The top end of tube 11 is heart-shape, as more clearly shown in Fig. 6, to provide a head 28. Between head 28 and the cylindrical portion 27 of tube 11, the outside diameter of the latter is reduced to provide a spool 29. A hole three-sixteenths of an inch is diameter is drilled through portion 27 and transversely of and through the longitudinal axis of tube 11 to provide two diametrically-opposite vent holes 30. For the purpose hereinafter explained, a hole 31 one-eighth of an inch in diameter is drilled through head 28 and transversely of and through the longitudinal axis of tube 11. A passage 32 one-thirty-second of an inch in diameter is drilled axially of tube 11 from the top end of the latter to and into hole 31. A cylindrical cap 33 which may be molded of plastic material, has at its open end an inside diameter slightly greater than the outside diameter of portion 27 so that it can fit over the latter with a frictional grip and be pressed down to engage shoulder 26, as shown in Fig. 1. Cap 33 then encloses head 28 and spool 29.

In the use of my improved device a length of suitable line 34 is employed. To serve the purpose, it is proposed to use nylon fishline in length from twelve to fifteen feet, or more or less as might be required. One end of line 34 is fixed to cap 33 in any suitable manner such as by threading it through two holes in the top of cap 33 and then tying this end of the line, as will be well understood. The other end of line 34 is threaded into passage 32 to the transverse hole 31 and is then worked radially outward, in either direction, through hole 31 to the outside. This end of line 34 is then knotted, the knot 35 being made of such size that it has a tight fit with respect to hole 31. Line 34 is now pulled outwardly and knot 35 is forced into hole 31, as far as passage 32. Passage 32, as specified, is substantially less in diameter than hole 31 and therefore will not permit passage of knot 35. Thus, this other end of line 34 is fixed to the head 28 of tube 11. For the purpose of stowing line 34, when the device is not in use, it is wound on spool 29 and cap 33 is put in place, as shown in Fig. 1.

In using my novel device to determine the depth in inches of any water at the bottom of a tank containing fuel oil, gasoline, or any other liquid having a viscosity higher than that of water, cap 33 is removed and the entire length of line 34 is unwound from spool 29. Line 34, at the end thereof fixed to head 28, is held firmly between the thumb and forefinger of one hand, and the device is suspended to be disposed vertically with its lower end 12 and valve 16 directly over the top, open end of the fill pipe of the tank. At this time, valve 16 should be open, as shown in Fig. 3. If valve 16 is closed as shown in Fig. 2 and is being held closed by the magnetic attraction or upward pull of permanent magnet 24 on valve part 17, the valve is manually forced away from its seat 15. It then remains in the open position shown in Fig. 3. This is because the combined weight in pounds of the valve stem or tubing 19, clip 20, and valve 16; with the valve disposed the distance d from the face of magnet 24; is greater than the pounds force exertable or effective by magnet 24 to urge the valve upward toward seat 15. Line 34 is now let out slowly to lower the device, down through the fill pipe and into the tank. Line 34 is slowly paid out until valve 16 reaches and engages the tank bottom, or engages any sludge or other material which might be on the tank bottom. Either is represented in Fig. 3 by line 36. In all the above, the following sequence of events takes place. Immediately after valve 16 is entirely below the level of the oil or other liquid in the tank, such liquid can and does flow through openings 25, into tubing 19. As lowering of the device down through the oil continues, the oil level with respect to the device rises therein, first up through tubing 19 and then up through tube 11 from the valve seat 15 toward the top end of tube 11. As this action occurs any air or gas which would otherwise be trapped in tube 11, escapes or vents out through openings 30 as the oil level rises. When valve 16 engages the tank bottom or engages any material which might be at the tank bottom directly under valve 16, and as lowering of the device continues after such engagement, two factors change. One of these is the downwardly-directed force of gravity which just previously had been holding valve 16 open against the opposite and vertically-directed force due to the magnetic attraction of the iron body portion 17 for magnet 24. This downwardly-directed force of gravity has now been eliminated, i.e., it is now zero. The other factor is the distance d which decreases to bring the face of magnet 24 that much closer to the iron body 17, thereby increasing the effective magnetic attraction to a point whereat valve 16 is snapped upwardly and held firmly against seat 15 to close opening 14, as shown in Fig. 2. With valve 16 closed and opening 14 sealed by neophene insert 18 compressed between body part 17 and valve seat 15, any water which might have entered tube 11 by way of opening 14 and tubing 19, is now held in tube 11. The device is now pulled out of the tank and up through and out of the fill pipe. The height of the water column in tube 11 is read directly on the inch scale shown in Fig. 1 and etched in or otherwise placed on the outside surface of tube 11. The scale reading gives the depth in inches of the water in the tank at the point where valve 16 engaged the bottom 36 of the tank.

It will be understood that both the distance d and the weight of the iron body part 17 must be such that until valve 16 engages the tank bottom 36 and until distance d becomes less, the magnetic attraction or force is insufficient to snap or pull valve 16 upwardly to its closed position shown in Fig. 2. Should the weight of body part 17 be insufficient in any particular case it can be increased by adding a lead insert, as shown in Fig. 7. In Fig. 7, the body part so modified is designated by the reference character 17' and the associated lead insert is designated by the reference numeral 37.

The insert or attachment 37, if of lead or any other suitable non-magnetic material, can serve another purpose. This relates to the fact that in time the iron body part 17 might become partly magnetized. In such case and with valve 16 engaged with or contacting the iron tank bottom 36, the magnetic attraction between the two might be sufficient to cause valve 16 to "stick" to the tank bottom and to such an extent that as the device is pulled up valve 16 remains fixed to the tank bottom until shoulder 23 engages the ends 21 of clip 20. By preventing direct connection of the iron body part 17' with the iron tank bottom 36, the lead insert 37 eliminates the possibility of valve 16 "sticking" to the iron tank bottom 36.

One of the broad aspects of my invention resides in the provision of an improved liquid-sampling device 10 of the character described and for the purpose disclosed, comprising a tube part 11 provided with a liquid-inlet opening 14 for the entrance of a liquid into the tube part 11 as the device is lowered substantially vertically disposed into the liquid, a valve part 16 carried by the tube part 11 and moveable with respect to the latter to open and close the opening 14, at least a portion 17 of one of the aforesaid parts such as the valve part 16 being of magnetic material, and means such as that designated by reference numeral 24 fixed with respect to the other of the aforesaid parts such as the tube part 11 and disposed in proximity to the magnetic material 17 and permanently magnetized and operable by virtue of its magnetic characteristic to hold the valve part 16 in the closed position thereof.

What might be considered the broadest aspect of my invention disclosed herein resides in the provision of the improved liquid-sampling device 10 comprising the part 11 provided with the liquid-inlet opening 14 so disposed that the liquid can flow into part 11 should the latter be lowered into the liquid, the valve part 16 carried by part 11 and moveable with respect to the latter to open and close opening 14, and valve-biasing means 24 carried by one of the parts such as the part 11, the valve-biasing means 24 being magnetic in nature and being so disposed with respect to the valve part 16 and being operable by virtue of its magnetic characteristic to assist in the closing movement of the valve part 16 and to hold the latter in the closed position thereof.

It will be understood that various modifications such as in the size, shape and arrangement of the respective parts can be made without departing from the spirit of my invention or the scope of the claims.

I claim as my invention:

1. In a liquid-sampling device of the character described, a tube provided at one end thereof with an opening for the entrance of a liquid into said tube as said device is lowered into said liquid vertically disposed and with said end lowermost, a valve, said tube being provided about said opening with a seat for said valve, means of non-magnetic material fixed to said valve and holding said valve in assembled relation with respect to said tube and for free movement longitudinally with respect to the latter to open and close said opening, at least part of said valve being of magnetic material, and magnetic means fixed with respect to said tube at said end thereof and effective by virtue of its magnetic characteristic and said magnetic material to hold said valve in the closed position thereof on said seat, said first-named means being provided with means disposed and arranged to limit longitudinal movement of said valve away from said seat to a predetermined distance from said seat; the combined weight in pounds of said first-named means and said valve being greater, with said device vertically disposed and with said valve lowermost and disposed at said distance from said seat, than the pounds of force exertable by said magnetic means on said valve in the direction to urge the latter upward toward said seat.

2. In a liquid-sampling device of the character described, a tube provided at one end thereof with an opening for the entrance of a liquid into said tube as said device is lowered into said liquid vertically disposed and with said end lowermost, a valve, said tube being provided about said opening with a seat for said valve, a relatively short piece of tubing of non-magnetic material fixed at one end thereof to said valve and holding said valve in assembled relation with respect to said tube and for free movement longitudinally with respect to the latter to open and close said opening, at least part of said valve being of magnetic material, and magnetic means fixed with respect to said tube at said end thereof and about said opening, said magnetic means being effective by virtue of its magnetic characteristic to hold said valve in the closed position thereof on said seat, said tubing at the other end of the latter being provided with means disposed and arranged to limit longitudinal movement of said valve away from said seat to a predetermined distance from said seat; the combined weight in pounds of said tubing and said valve and said means being greater, with said device vertically disposed and with said valve lowermost and disposed at said distance from said seat, than the pounds of force exertable by said magnetic means on said valve and in the direction to urge the latter upward toward said seat, said tubing being provided at the end thereof fixed to said valve with an opening for the entrance of said liquid into said tubing and by way of the latter into said tube.

3. In a liquid-sampling device of the character described, a tube provided at an end thereof with an opening for the entrance of a liquid into said tube as said device is lowered substantially vertically disposed into said liquid, with said end leading, valve means carried by said tube and moveable with respect thereto to open and close said opening and functional to remain in its open position during lowering of said device as aforesaid, at least part of said valve means being of magnetic material, and means fixed with respect to said tube and permanently magnetized and operable by virtue of its magnetic characteristic to hold said valve means in the closed position thereof after said device has been lowered into said liquid and the desired sample of liquid has entered said tube.

4. In a liquid-sampling device of the character described, a tube having an opening at an end thereof, a valve comprising a body part of magnetic material and a stem of non-magnetic material fixed at one end thereof to said part and having a relatively loose fit in said opening to permit longitudinal movement of said valve toward and over said opening to close the same and away from said opening to open the same, and means fixed with respect to said tube at said end thereof and about said opening and permanently magnetized and operable by virtue of its magnetic characteristic to hold said valve in the closed position thereof with said device substantially vertically disposed and said end of said tube lowermost.

5. In a liquid-sampling device of the character described, a tube part provided at an end thereof with an opening for the entrance of a liquid into said tube part as said device is lowered substantially vertically disposed into said liquid with said end leading, a valve part carried by said tube part and moveable with respect thereto to open and close said opening and functional to remain in its open position during lowering of said device as aforesaid, at least a portion of one of said parts being of magnetic material, and means fixed with respect to the other of said parts and disposed in proximity to said magnetic material and permanently magnetized and operable by virtue of its magnetic characteristic to hold said valve part in the closed position thereof after the lowering of said device and the desired sample of liquid has entered said tube part.

6. In a liquid-sampling device of the character described, a tube part provided at an end thereof with an opening for the entrance of a liquid into said tube part as said device is lowered substantially vertically disposed into said liquid with said end leading, a valve part carried by said tube part and effective to close said opening and functional to remain in its open position during lowering of said device as aforesaid, at least a portion of one of said parts being of magnetic material, and means fixed with respect to the other of said parts and disposed in proximity to said magnetic material, said means being of material substantially permanently magnetized and operable by virtue of its magnetic material to hold said valve part in the closed position thereof after the lowering of said device and the desired sample of liquid has entered said tube part, one of said parts being provided with means disposed for engagement with the other of said parts to limit opening movement of said valve part to a predetermined distance.

7. The combination with a liquid-sampling device of the character described comprising a tubular part provided at an end thereof with a liquid-inlet opening for the entrance of a liquid into said tubular part as said device is lowered substantially vertically disposed into said liquid with said end leading, said device being provided with a vent disposed to permit the escape of gas from said tubular part upon the entrance of said liquid into the latter as aforesaid, and a valve part carried by said tubular part moveable with respect to the latter to open and close said opening; and functional to remain in its open position during lowering of said device as aforesaid; of magnetic means carried by one of said parts and operable by virtue of its magnetic capability to magnetically attract said valve part to hold the same in the closed position thereof after the lowering of said device and the desired sample of liquid has entered said tubular part.

8. A liquid-sampling device of the character described comprising a part provided with a liquid-inlet opening so disposed that the liquid can flow into said part should said device be lowered into said liquid with said opening leading, a valve part moveable with respect to said first-named part to open and close said opening and functional to remain in its open position during lowering of said device as aforesaid, and valve-biasing means carried by one of said parts, said valve-biasing means being magnetic in nature and being so disposed with respect to said valve part and being operable by virtue of its magnetic characteristic to exert a magnetic attraction on said valve part to assist in the closing movement of said valve part and to hold the latter in the closed position thereof after the lowering of said device and the desired sample of liquid has flowed into said first-named part.

References Cited in the file of this patent

UNITED STATES PATENTS

| | | |
|---|---|---|
| 1,393,279 | Gersdorff | Oct. 11, 1921 |
| 2,593,830 | Baker | Apr. 22, 1952 |
| 2,672,257 | Simmonds | Mar. 16, 1954 |
| 2,728,397 | Ruska | Dec. 27, 1955 |